United States Patent [19]
Allard

[11] Patent Number: 4,679,287
[45] Date of Patent: Jul. 14, 1987

[54] HEATED VARIABLE CROWN ROLL

[75] Inventor: Andre Allard, Kalamazoo, Mich.

[73] Assignee: Beloit Corporation, Beloit, Wis.

[21] Appl. No.: 657,738

[22] Filed: Oct. 4, 1984

[51] Int. Cl.⁴ .......................................... B21B 13/02
[52] U.S. Cl. ..................... 29/116 AD; 100/162 B; 100/93 RP
[58] Field of Search ............ 29/110, 116 AD, 116 R, 29/113 R, 113 AD; 100/162 B, 93 RP

[56] References Cited

U.S. PATENT DOCUMENTS

| | | | |
|---|---|---|---|
| 2,793,006 | 5/1957 | Eaby | 100/93 RP X |
| 3,846,883 | 11/1974 | Biondetti | 29/116 AD |
| 4,154,078 | 5/1979 | Lehmann | 100/93 RP X |
| 4,282,638 | 8/1981 | Christ et al. | 29/116 AD |
| 4,282,639 | 8/1981 | Christ et al. | 100/162 B X |
| 4,520,723 | 6/1985 | Pav et al. | 29/116 AD |

FOREIGN PATENT DOCUMENTS 396462 3/1974 U.S.S.R. ..................... 29/116 AD

Primary Examiner—Timothy V. Eley
Attorney, Agent, or Firm—Dirk J. Veneman; Raymond W. Campbell; Gerald A. Mathews

[57] ABSTRACT

A controlled deflection roll for operating at a predetermined heated temperature including a roll shell rotatably journalled on a shaft with the roll shell supported along its length on a piston in a chamber in the shaft and support oil delivered beneath the piston and passing into pockets on the outer surface of the piston to support the roll shell, heated oil delivered to the spaced between the shaft and roll shell, and an annular chamber of insulating oil at the ends of the roll shell between the shell and the end bearings.

6 Claims, 6 Drawing Figures

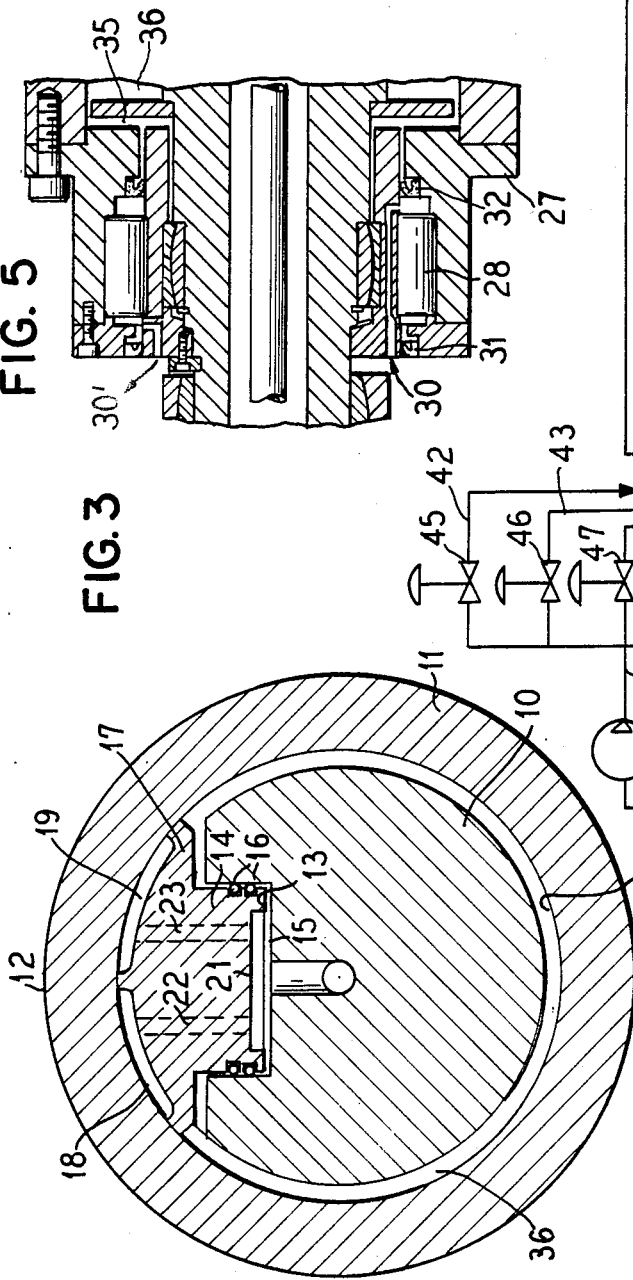

HEATED VARIABLE CROWN ROLL

BACKGROUND OF THE INVENTION

1. Field of the Invention

The present invention relates to crown rolls, and more particularly to crown rolls which provide adjustment of the roll shell, heating of the shell with respect to the product and insulation of the roll bearings from the heat of shell heating.

The present invention also relates to improvements in controlled deflection rolls and particularly to a roll which is to operate at a predetermined elevated temperature with means for controlling that temperature.

More particularly, the improvement relates to a controlled deflection roll of the type which has a tubular rotatable roll shell supported on a through shaft. The roll shell is supported and prevented from deflecting by transferring a working load through the roll shell to a pressure means between the shaft and the roll shell. Preferably, the pressure means is in the form of a piston extending axially along the shaft with supporting oil beneath the piston. The piston has an outer face with pockets which provides for lubrication between the roll shell and piston. A support oil is utilized to support the piston and control the roll shell deflection and to provide the lubrication between the piston and roll shell. In the present arrangement, a heat transfer oil is arranged to operate at a predetermined elevated temperature so as to maintain the roll shell at a predetermined temperature.

2. Description of the Prior Art

Typical of well-received crown rolls is the crown roll, commonly known as the swimming roll, disclosed by Kusters et al. in their U.S. Pat. No. 3,131,625; however, there is no provision for a thermal buffer from the roll shell heating space to the bearing. The same is true with respect to Christ et al U.S. Pat. No. 4,282,638 and 4,282,629. The known art, however, does not go to the problem of reducing bearing heating.

In devices of this type heretofore used, difficulties were encountered in heat loss from the oil. The heat loss which occurred in an axial direction resulted in excessive heat transfer and damage to the bearings. Also, in some instances the same oil was used for the bearings which created difficulties because of the high temperatures which were encountered.

SUMMARY OF THE INVENTION

It is accordingly an object of the present invention to provide a controlled deflection roll which is capable of operating at a predetermined elevated temperature wherein unique means are provided for reducing the heat loss in an axial direction and particularly for reducing the heat transfer to the lubricant of the bearings.

A further object of the invention is to provide a controlled deflection heated roll with means for lubrication of the bearings by a cooled portion of the fluid pressure system.

A still further object of the invention is to provide an improved and unique structural arrangement for a piston which supports a roll shell in a controlled deflection roll and for handling the oil which heats the roll shell and transfers the thermal energy thereto for having it operate at a predetermined temperature.

With the present arrangement, improved control of the temperature of the roll shell is attained along its operating length with improved support facility and improved heat transfer. The roll shell is capable of being operated at a relatively high elevated temperature without deleterious effects to the end bearings.

A feature of an embodiment of the invention is to provide three supplies of lubricating fluid or oil for independently and individually performing three functions. While an oil is preferred, other forms of fluids may be employed as will become clear in the description. A support oil is supplied under pressure and at a limited flow volume to provide a deflection control support for the roll shell. A heat transfer oil is supplied at an increased volume and at less pressure to the roll for controlling its operating temperature. A third or bearing and insulating oil is supplied to an insulating pocket between the roll shell and bearings so that excessive heat transfer to the bearings is prevented. This oil flows partially in concert with the heat transfer oil. The same type of oil is supplied to all three areas, for the support, heat transfer, and insulating function but under different physical conditions, with the support oil being supplied at high pressure, the heat transfer oil being supplied at relatively high volume and controlled temperature, and the insulating oil being supplied at a reduced temperature.

A feature of another embodiment of the invention is to provide three supplies of lubricating fluid or oil for independently and individually performing the above-mentioned three functions. While, as above, an oil is preferred, other forms of fluids may also be used as set forth above. As above, a support oil is supplied under pressure and at a limited flow volume to provide a deflection control support for the roll shell. A heat transfer oil is supplied at an increased volume and at less pressure to the roll for controlling its operating temperature. A third or bearing and insulating oil is supplied to the bearing chamber and to the aforementioned insulating pocket. This oil flows separately from the heating oil.

Other objects, advantages and features of the invention will become more apparent with the teaching of the principles thereof in the specification, claims and drawings, in which:

DESCRIPTION OF THE DRAWINGS

FIG. 3 is a vertical sectional view taken substantially along line III—III of FIG. 2;

FIG. 4 is a schematic showing of the roll of FIGS. 1 through 3, but also showing the fluid circulation systems according to a first embodiment of the invention;

FIG. 5 is a schematic showing of the roll of FIGS. 1 through 3, showing a fluid system in accordance with another embodiment of the invention; and FIG. 6 is a schematic showing of a roll constructed for operation in accordance with the embodiment schematically illustrated in FIG. 5.

DESCRIPTION OF THE PREFERRERD EMBODIMENTS

Figure 1:
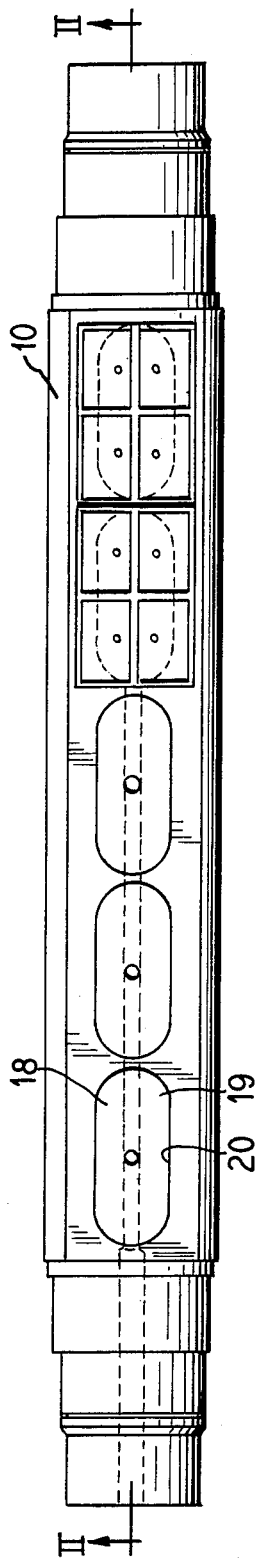
FIG. 1 is a top plan view of the center shaft which supports the roll shell.
Figure 2:
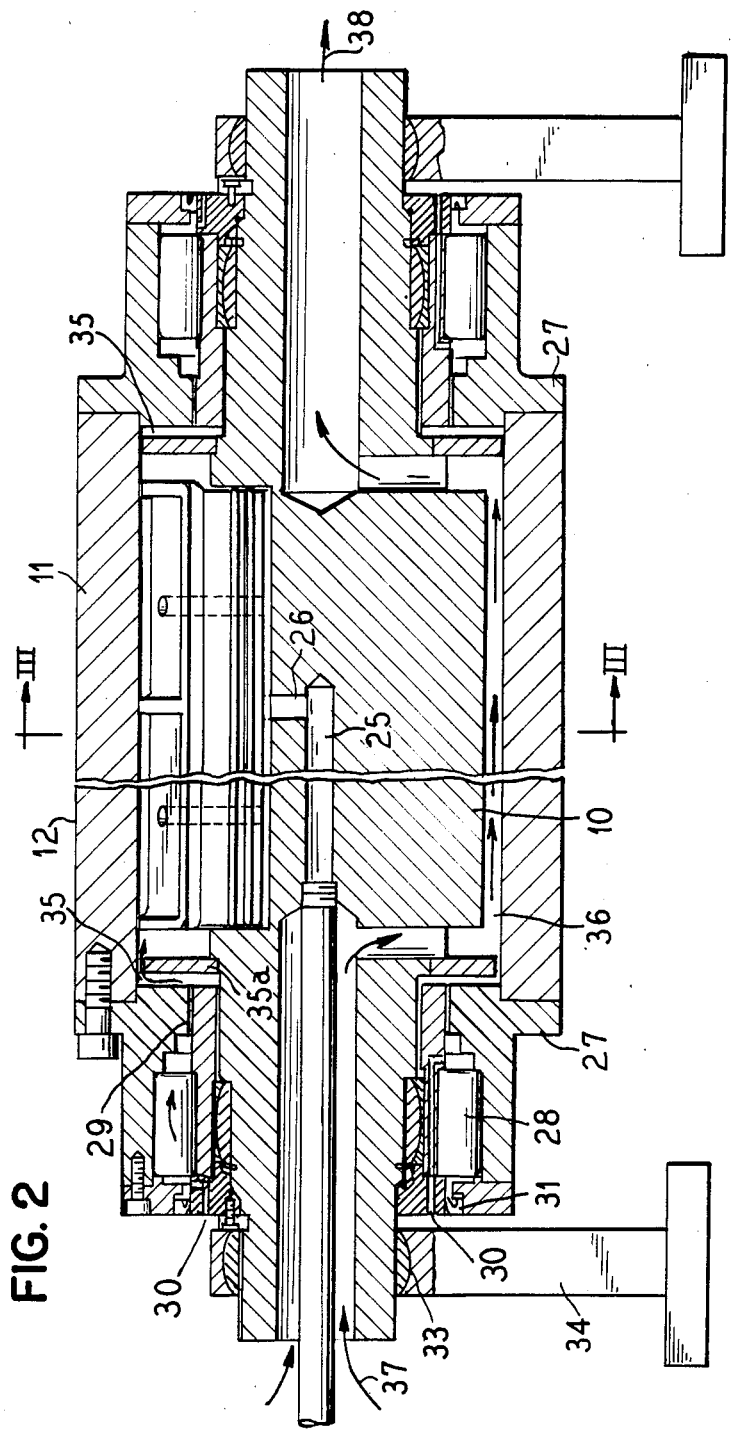
FIG. 2 is a vertical sectional view taken substantially along line II—II of FIG. 1, but including the roll shell.

As viewed in FIGS. 1, 2, and 3, the pressure roll assembly has a central supporting shaft 10 which extends through the center of a rotatable tubular roll shell 11. The roll shell has a smooth outer surface and engages a working load at one circumferential location 12.

The roll shell is supported and prevented from deflecting by a pressure means between the shaft 10 and the roll shell 12. In the preferred arrangement shown, the pressure arrangement is in the form of a supply tube 26, and a piston 14, FIG. 3, seated in a recess 13 extending axially along the length of the shaft 10. The chamber has straight side walls so that rings or seals 16 in the piston will engage the side walls and prevent leakage from the oil pressure area 15 beneath the piston.

Support oil is supplied to the pistons at controlled pressure to the oil pressure areas beneath the pistons. A second heavier flow of heated oil is provided at low pressure for heat transfer oil. While the support oil is delivered at the same temperature as the heat transfer oil, it is delivered at a lower volume and, of course, at a higher pressure to provide the support function. The support oil is led out for lubricating the roll on the pistons to a series of pockets 18 and 19 along the length of the piston. As shown schematically in the face of the piston in FIG. 1, the pockets may be divided into leading and trailing pockets depending upon the direction of rotation of the shaft. The pockets are oval in shape and are arranged adjacent each other along the length of the shaft. An annular seal may be provided at the outer edge of the pockets, or the edge of the outer surface of the piston which slides against the inner smooth surface 24 of the roll shell may provide an adequate seal. Passages 22 and 23 lead from the recess beneath the piston to the pockets. Some leakage of oil from the pockets into the space 36 between the shaft and the roll shell will, of course, occur.

Various forms of oil or working fluid may be utilized for the heat transfer and for the lubrication of the pistons. Liquid such as known by the tradenames Mobil Glygoyle 22 or Mobil Glygoyle 30 can be heated to temperatures up to 450° F. For the support and lubrication function, the oil is forced under pressure to the space beneath the shoes at pressures of less than 250 psi and pumps may be provided operating at up to 850° F. which provide this pressure, and such pumps will be commercially available as will be recognized by those versed in the art. The wide piston, however, which is shown as having overlapping sides to provide a broad shoe requires low hydraulic pressures of about 155 psi for a working face force along the roll of 775 pli. Thus, the oil supports the piston acting upwardly on the surface 21 under the piston. The amount of oil supplied for maintaining a working face pressure is small relative to the amount of oil passing through the roll for heat transfer purposes. For example, typically 10 gallons per minute oil flow would be supplied to the roll for working face pressure while approximately 300 gallons per minute would be supplied at a velocity on the order of 6 feet per second for heat transfer oil flow. The oil flow through the piston chambers provides some heat transfer, but its principal function is to support the roll shell and prevent its deflection and to lubricate the pistons against the roll shell.

As will be described in connection with FIGS. 2 and 4, a separate flow of the same oil is supplied to insulating chambers at the ends of the roll by a separate pump and heat exchanger.

A feature of the invention is the prevention or reduction of heat transfer from the support oil and the heat transfer oil to the end bearings. For the reduction of transfer of heat to the bearings, an annular insulation chamber 35 is provided at the axial ends of the piston. This annular chamber 35 is provided by a stationary ring 35a which allows leakage past its outer annular edge into the space 36 so that the oil in the chamber 35 operates as an insulator.

As will be seen from FIGS. 2 and 3, pressurized support oil is continually pumped into the shaft through an axial passage 25 which has a radial continuation bore 26 communicating into the chamber 15 beneath the piston. A relatively small leakage of working oil passes down into the space 36 between the shaft and the roll shell to merge with the heating oil and to be pumped out the other end of the shaft as indicated by the arrowed line 38.

A continual flow of thermal oil for heat transfer is passed through the shell into the space 36 between the shaft and roll shell to maintain the temperature of the roll shell and the flow of oil is shown by the arrowed line 37 in FIG. 2, this line also being shown in FIG. 4.

The roll shell is centered at its ends by annular bearings 28 between the shaft and roll shell. The shaft itself is rigidly carried on a stand 34 provided with universal bearings 33 to allow bending of the shaft with load.

Bearing lubricating and heat insulating oil at a reduced temperature enters the bearings through a passage 30 and escapes through a passages 29, 29' into the annular insulating chambers 35 and the space 36 as indicated by the arrowed lines in FIG. 2 and by the lines in FIG. 4.

This bearing lubricating and insulating oil is forced into the annular insulating chambers 35 between the bearings and roll shell. The insulating chambers provide a heat barrier reducing heat transfer from the space 36 between the roll shell and the shaft towards the bearings. Actually, this bearing lubricating and insulating oil is cooled so as to maintain the oil at a temperature to protect the bearings.

Seals 31 are provided at the outboard side of the bearings.

The oil circulation system is indicated in FIG. 4. Pressure support oil is delivered from a high pressure pump 40. While the arrangement of FIGS. 1 through 3 show a single supply for all the pistons, the supply may be divided into several sections with separate sections at the center and at the ends which permit zone control along the roll. As shown the delivery from the pressure pump 40 is through a line 41 through the separate pressure controls 45, 46 and 47 which deliver to separate lines 42, 43 and 44. With separate lines and separate pressure controls, controlled pressure along the roll shell may be obtained. A portion of support oil may be bypassed through a pressure control valve 49 to the line 37 for control of supply pressure. Oil is supplied to the pressure pump 40 through its intake line 50 from a heater 51. The heater 51 maintains the heating oil at the temperature needed to control the temperature of the roll. Oil is supplied to the heater from a supply pump 53 and the supply pump provides heat transfer oil at a substantial volume. As stated above, typically oil flowing through the heat transfer delivery line 37 into the roll shell would be on the order of 300 gallons per minute at a velocity of approximately 6 feet per second. The high pressure pump delivering support oil to the pockets beneath the working face of the roll shell would deliver oil at a flow rate of approximately 10 gallons per minute. A reservoir 54 is placed in the return line 38 from the roll shell, which return line leads to the intake of the circulation pump 53.

A separate circuit is provided for the bearing lubricating oil. Passageways shown at 30 are provided for supplying oil to the annular insulating chambers 35. This oil flows in the passage 29 around outer annular edge of ring 35a back into space 36. As the insulating oil flows, it is circulated by a pump 57 which delivers oil through an oil cooler 58 to flow into the insulating passages to the insulating chambers. The circulation of oil for the relatively stagnant or dead body of insulating oil in the space 35 is controlled at a rate to reduce heat transfer to the area of the bearings 28 a degree so that the lubricant in the bearings retains its lubricating properties and is not raised to a temperature so as to impair lubricating properties and permit damage to the bearings.

In operation heat transfer oil is supplied to the roll in a continuous relatively high volume flow, heated by the heater 51 and delivered into the space 36 between the roll shell and shaft. The flow is at a sufficient volume and rate so there will not be sufficient temperature drop so as to cause a temperature differential from the entry to the delivery end in the flow from 37 to 38 as shown in FIG. 4.

The same oil at the same temperature for a support function is delivered at a higher pressure and a lower volume by the pump 40 to the spaces 15 beneath the piston and to the pockets 18 and 19 opposite the working face of the roll shell. The support oil which leaks out of the pockets will rejoin the flow of heat transfer oil and leave through the circulation line 38.

A separate flow of thermal insulating oil is provided to annular spaces 35 between the roll shell and the bearings. This oil is cooled and circulated in the insulating chambers so as to minimize and control the heat loss in an axial direction and prevent increase in temperature of the bearings such that the lubricating fluid in the bearings 28 breaks down. The insulating oil is the same material as used for the heat transfer and support oil.

The insulating chambers 35 between the bearings and roll shell provide a heat barrier reducing heat transfer from the space 36 between the roll shell and the shaft.

Another circulation system is indicated in FIGS. 5 and 6. Pressure support oil is delivered from the high pressure pump 40. As before, the delivery from the pressure pump 40 is through a line 41 through the separate pressure controls 45, 46 and 47 which deliver to separate lines 42, 43 and 44. With separate lines and separate pressure controls, controlled pressure along the roll shell may be obtained. A portion of support oil may be bypassed through a pressure control valve 49 to the line 37 for control of supply pressure. Oil is supplied to the pressure pump 40 through its intake line 50 from a heater 51. The heater 51 maintains the heating oil at the temperature needed to control the temperature of the roll. Oil is supplied to the heater from a supply pump 53 and the supply pump provides heat transfer oil at a substantial volume. As stated above, typically oil flowing through the heat transfer delivery line 37 into the roll shell would be on the order of 300 gallons per minute at a velocity of approximately 6 feet per second. The high pressure pump delivering support oil to the pockets beneath the working face of the roll shell would deliver oil at a flow rate of approximately 10 gallons per minute. A reservoir 54 is placed in the return line 38 from the roll shell, which return line leads to the intake of the circulation pump 53.

A separate circuit is provided for the bearing lubricating oil. Passageways 30 are provided for supplying oil to the bearings 28. Return passageways 30' are provided for the return of insulating oil. As the lubricating oil flows, it is circulated by a pump 57 which delivers oil through an oil cooler 58 to flow into the bearings. The relatively stagnant or dead body of insulating oil seeps into the space 35 from the heating oil in the space 36 into the space 36 (laminar or dead flow) reduces heat transfer to the area of the bearings 28 a degree so that the lubricant in the bearings retains its lubricating properties and is not raised to a temperature so as to break down and permit damage to the bearings. In this embodiment, the passageways 29 are blocked by seals 32. In this embodiment, regular lubricating oil can be used for the bearings and a thermal liquid, such as Mobiltherm 603 or Therminol 55, can be used for the heating oil and for the pressure oil for the pistons in excess of 550° F.

Thus, it will be seen I have provided an improved controlled deflection temperature control roll which meets the objectives and advantages above set forth and is capable of continued reliable operation controlling deflection and roll temperature.

I claim as my invention:

1. A roll for operating at a predetermined temperature comprising, in combination:
   a rotable roll having a cylindrical working face and a longitudinal axis;
   a stationary shaft means for supporting the rotable roll;
   bearing means at each end of the roll between the shaft means and the roll, whereby an imaginary line which is perpendicular to the longitudinal axis and passes through a bearing does not pass through the working face;
   an annular insulating fluid chamber adjacent each end of the roll shell between a respective bearing means and each respective end of the roll for reducing thermal transmission between the roll and bearing means,
   means for delivering a heated fluid to the roll to maintain the roll at a working temperature, and
   means for delivering an insulating fluid separate from the heated fluid to each of said chambers for absorbing heat from the roll and preventing said heat from the heated fluid from reaching the bearing means.

2. A roll for operating at a predetermined temperature constructed in accordance with claim 1:
   including cooling means for reducing the temperature of the fluid supplied to each of said chambers.

3. A roll for operating at a predetermined temperature constructed in accordance with claim 1:
   wherein a heater is provided for heating the heated fluid.

4. A roll for operating at a predetermined temperature constructed in accordance with claim 1: wherein the means for delivering the insulating fluid directs the insulating fluid first into the bearings and than into the insulating chambers to control the temperature of the bearings.

5. A controlled deflection roll for operating at a predetermined temperature comprising, in combination:
   a tubular rotable roll shell having a working face and an inner surface;
   a stationary shaft means extending through the roll shell;
   annular bearings at each end of the roll shell for centering the shell for rotation on the shaft means;
   pressure means between the shaft and the inner surface of the roll shell supporting the shell on the shaft means and defining a nip location;

a fluid pressure supply connected to said pressure means for supplying a support fluid thereto, thermal insulating means adjacent each end of the roll shell, each insulating means comprising a fluid chamber including a ring attached to the stationary shaft and having an outer annular edge whereby a gap is provided between the outer annular edge and the inner surface of the roll shell, each chamber being located between a respective bearing and the roll shell for limiting the transfer of thermal energy from the roll shell to the bearings.

6. A controlled deflection roll for operating at a predetermined temperature comprising in combination:

a tubular rotatable roll shell having a working face and an inner surface;

a stationary shaft extending through the roll shell with a space between the roll shell and the shaft;

annular bearings at each end of the roll shell centering the shell for rotation on the shaft;

an axially extending recess on the shaft for receiving an axially extending piston between the roll shell and the shaft and engaging the inner surface for supporting the roll shell against deflection on the shaft;

an axially extending piston, having an outer surface in the recess;

means defining pockets between the outer surface of the piston and the inner surface of the roll shell;

a first fluid pressure supply means connected to the recess beneath the piston for supplying a support fluid for supporting the piston to transfer a load on the roll shell through the piston to the shaft;

a passage means through the piston connected between the recess beneath the piston and the pockets;

a heat exchanger connected to the first fluid pressure supply means for thermally heating the support fluid to bring it to a predetermined temperature;

an annular insulating chamber at each end of the roll shell, each chamber including a ring attached to the stationary shaft and having an outer annular edge whereby a gap is provided between the outer annular edge and the inner surface of the roll shell for receiving insulating thermal fluid thereby reducing the heat transfer from the support fluid to the bearings;

pressure pump means for delivering said support fluid under pressure to said recess beneath the piston; and a second pump means for delivering a substantial flow of said support fluid to said space to transfer thermal energy to the roll shell.

* * * * *